United States Patent
Tejani et al.

(10) Patent No.: US 7,933,608 B2
(45) Date of Patent: Apr. 26, 2011

(54) METHODS, SYSTEMS, AND COMPUTER PROGRAM PRODUCTS FOR PROVIDING PRESENCE GATEWAY FUNCTIONALITY IN A TELECOMMUNICATIONS NETWORK

(75) Inventors: Aziz A. Tejani, Morrisville, NC (US); Richard E. Schaedler, New Hill, NC (US); Venkataramaiah Ravishankar, Cary, NC (US); Joe E Defenderfer, Apex, NC (US); Larry Gene Slate, Cary, NC (US); Patricia A. Baldwin, Raleigh, NC (US); Richard Nolan Kennedy, Jr., Naperville, IL (US)

(73) Assignee: Tekelec, Morrisville, NC (US)

( * ) Notice: Subject to any disclaimer, the term of this patent is extended or adjusted under 35 U.S.C. 154(b) by 927 days.

(21) Appl. No.: 11/077,711

(22) Filed: Mar. 11, 2005
(Under 37 CFR 1.47)

(65) Prior Publication Data
US 2005/0266859 A1    Dec. 1, 2005

Related U.S. Application Data

(60) Provisional application No. 60/552,378, filed on Mar. 11, 2004.

(51) Int. Cl.
*H04Q 7/20*    (2006.01)
(52) U.S. Cl. ............... 455/456.1; 455/456.4; 455/404.2; 455/414; 455/432.1; 455/433; 709/220; 370/338
(58) Field of Classification Search .................. 455/432, 455/456.4, 414, 433, 456.1; 709/220; 370/328, 370/338
See application file for complete search history.

(56) References Cited

U.S. PATENT DOCUMENTS

| | | | |
|---|---|---|---|
| 5,341,680 A | 8/1994 | Smart et al. | |
| 5,579,371 A | 11/1996 | Aridas et al. | |
| 5,610,969 A | 3/1997 | McHenry et al. | |
| 5,774,668 A | 6/1998 | Choquier et al. | |
| 5,812,639 A | 9/1998 | Bartholomew et al. | |
| 5,999,525 A | 12/1999 | Krishnaswamy et al. | |
| 6,091,957 A | 7/2000 | Larkins et al. | |

(Continued)

FOREIGN PATENT DOCUMENTS
EP    1 269 764 B1    7/2008
(Continued)

OTHER PUBLICATIONS

Campbell et al., "SIP Instant Message Sessions," p. 1 (Jun. 30, 2003).

(Continued)

*Primary Examiner* — Patrick N Edouard
*Assistant Examiner* — Fred A Casca
(74) *Attorney, Agent, or Firm* — Jenkins, Wilson, Taylor & Hunt, P.A.

(57) ABSTRACT

A method for providing presence gateway functionality includes deriving presence information for subscribers in a first set of subscribers based on telecommunications signaling messages. The first set of subscribers includes at least one subscriber who is not a subscribed-to presentity. The method also includes determining whether presence status information for a subscriber in the first set of subscribers has changed. In response to detecting a change in presence status, it is determined whether the subscriber is a subscribed-to presentity. If the subscriber is a subscribed-to presentity, a presence server is notified of the change in status of the subscriber.

34 Claims, 12 Drawing Sheets

U.S. PATENT DOCUMENTS

| | | | |
|---|---|---|---|
| 6,091,959 A | 7/2000 | Souissi et al. |
| 6,094,573 A | 7/2000 | Heinonen et al. |
| 6,115,754 A | 9/2000 | Landgren |
| 6,119,014 A | 9/2000 | Alperovich et al. |
| 6,122,510 A | 9/2000 | Granberg |
| 6,128,304 A | 10/2000 | Gardell et al. |
| 6,134,314 A | 10/2000 | Dougherty et al. |
| 6,134,432 A | 10/2000 | Holmes et al. |
| 6,181,937 B1 | 1/2001 | Joensuu |
| 6,215,790 B1 | 4/2001 | Voit et al. |
| 6,219,551 B1 | 4/2001 | Hentilä et al. |
| 6,252,952 B1 | 6/2001 | Kung et al. |
| 6,301,609 B1 | 10/2001 | Aravamudan et al. |
| 6,304,565 B1 | 10/2001 | Ramamurthy |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,430,176 B1 | 8/2002 | Christie, IV |
| 6,446,127 B1 | 9/2002 | Schuster et al. |
| 6,453,034 B1 | 9/2002 | Donovan et al. |
| 6,456,845 B1 | 9/2002 | Drum et al. |
| 6,470,179 B1 | 10/2002 | Chow et al. |
| 6,515,997 B1 | 2/2003 | Feltner et al. |
| 6,564,261 B1 | 5/2003 | Gudjonsson et al. |
| 6,571,094 B1 | 5/2003 | Begeja et al. |
| 6,611,516 B1 | 8/2003 | Pirkola et al. |
| 6,639,981 B1 | 10/2003 | Dunn, Jr. et al. |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,968,052 B2 | 11/2005 | Wullert, II |
| 7,058,036 B1 | 6/2006 | Yu et al. |
| 7,146,181 B2 | 12/2006 | Schaedler et al. |
| 7,209,968 B1 | 4/2007 | Secer |
| 7,260,207 B2 | 8/2007 | Marsico |
| 7,701,925 B1 | 4/2010 | Mason et al. |
| 2001/0031641 A1 | 10/2001 | Ung et al. |
| 2001/0034224 A1 | 10/2001 | McDowell et al. |
| 2002/0058507 A1 | 5/2002 | Valentine et al. |
| 2002/0078209 A1 | 6/2002 | Peng |
| 2002/0086672 A1* | 7/2002 | McDowell et al. ........... 455/432 |
| 2002/0187781 A1* | 12/2002 | Furlong ........................ 455/433 |
| 2003/0026289 A1 | 2/2003 | Mukherjee et al. |
| 2003/0031160 A1 | 2/2003 | Gibson Ang et al. |
| 2003/0073440 A1 | 4/2003 | Mukherjee et al. |
| 2003/0100326 A1 | 5/2003 | Grube et al. |
| 2003/0148779 A1 | 8/2003 | Aravamudan et al. |
| 2003/0177281 A1 | 9/2003 | McQuillan et al. |
| 2003/0235180 A1 | 12/2003 | Oprescu-Surcobe et al. |
| 2004/0003037 A1 | 1/2004 | Fukimoto et al. |
| 2004/0015569 A1* | 1/2004 | Lonnfors et al. ............... 709/220 |
| 2004/0047303 A1 | 3/2004 | Fernandez et al. |
| 2004/0062383 A1 | 4/2004 | Sylvain |
| 2004/0125790 A1 | 7/2004 | Hiller et al. |
| 2004/0153506 A1 | 8/2004 | Ito et al. |
| 2004/0193686 A1 | 9/2004 | Blagsvedt et al. |
| 2004/0203923 A1 | 10/2004 | Mullen |
| 2005/0027867 A1 | 2/2005 | Mueller et al. |
| 2005/0050157 A1 | 3/2005 | Day |
| 2005/0070310 A1 | 3/2005 | Caspi et al. |
| 2005/0074101 A1* | 4/2005 | Moore et al. ............. 379/114.01 |
| 2005/0091387 A1 | 4/2005 | Abe |
| 2005/0136952 A1 | 6/2005 | Zabawskyj et al. |
| 2005/0143111 A1 | 6/2005 | Fitzpatrick et al. |
| 2005/0143135 A1 | 6/2005 | Brems et al. |
| 2005/0164682 A1 | 7/2005 | Jenkins et al. |
| 2005/0202836 A1 | 9/2005 | Schaedler et al. |
| 2005/0228895 A1 | 10/2005 | Karunamurthy et al. |
| 2006/0112177 A1 | 5/2006 | Barkley et al. |
| 2006/0140189 A1 | 6/2006 | Wu et al. |
| 2006/0246880 A1 | 11/2006 | Baldwin et al. |
| 2007/0127676 A1 | 6/2007 | Khadri |
| 2010/0017472 A1 | 1/2010 | Benedyk et al. |
| 2010/0137002 A1 | 6/2010 | Agarwal et al. |
| 2010/0205248 A1 | 8/2010 | Mason et al. |

FOREIGN PATENT DOCUMENTS

| | | |
|---|---|---|
| JP | 2005057709 | 3/2005 |
| WO | WO 99/14910 | 3/1999 |
| WO | WO 00/35155 | 6/2000 |
| WO | WO 01/56308 | 8/2001 |
| WO | WO 01/72055 A2 | 9/2001 |
| WO | WO 2005/086966 A2 | 9/2005 |
| WO | WO 2005/086972 A2 | 9/2005 |
| WO | WO 2006/118755 A2 | 11/2006 |
| WO | WO 2007/050591 A2 | 5/2007 |

OTHER PUBLICATIONS

Campbell et al., "Session Initiation Protocol (SIP) Extension for Instant Messaging," pp. 1-15 (Dec. 2002).

Day et al., "Instant Messaging/Presence Protocol Requirements," pp. 1-20 (Feb. 2000).

Day et al., "A Model for Presence and Instant Messaging," pp. 1-13 (Feb. 2000).

Commonly-assigned, co-pending U.S. Appl. No. 09/627,253 for "Presence Registration and Routing Node," (Unpublished, filed Jul. 28, 2000).

Sugano et al., "Presence Information Data Format for IMPP," Internet draft, draft-ietf-impp-pidf-01.txt, Network Working Group, p. 1-17, (Mar. 10, 2000).

Aggarwal et al., "Transport Protocol for Presence information / Instant Messaging," Internet draft, draft-ietf-impp-pitp-mitp-01, Network Working Group, p. 1-21, (Mar. 9, 2000).

Stracke, "Message Information Data Format," Internet draft, draft-ietf-impp-midf-01.txt, Network Working Group, p. 1-4, (Jan. 19, 2000).

Tekelec, "IP$^7$ Secure Gateway Release 1. 0", Tekelec Release Documentation, 910-2046-01 Revision A (Nov. 1999).

Handley et al., "SIP: Session Initiation Protocol," Request for Comments: 2543, Network Working Group, p. 1-111, (Mar. 1999).

Handley et al., "SDP: Session Description Protocol," Request for Comments: 2327, Network Working Group, p. 1-42, (Apr. 1998).

Tekelec, "Feature Guide Eagle STP," P/N 910-1225-01 Revision B (Jan. 1998).

Tekelec, "Feature Guide LNP LSMS," P/N 910-1598-01 Revision A (Jan. 1998).

Notification of Transmittal of the International Search Report and the Written Opinion of the International Searching Authority, or Declaration (PCT/US02/08307, Mar. 11, 2005).

Campbell et al., "SIP Instant Message Sessions," p. 1 (Jun. 30, 2003).

Campbell et al., "Session Initiation Protocol (SIP) Extension for Instant Messaging," pp. 1-15 (Dec. 2002).

Day et al., "Instant Messaging/Presence Protocol Requirements," pp. 1-20 (Feb. 2000).

Day et al., "A Model for Presence and Instant Messaging," pp. 1-13 (Feb. 2000).

Notification of Transmittal of the International Search Report and the Written Opinion of the International Searching Authority, or the Declaration for International Application No. PCT/US05/08258 (Aug. 16, 2006).

Notice of Abandonment for U.S. Appl. No. 09/627,253 (Nov. 12, 2008).

Office Action for U.S. Appl. No. 11/586,423 (Jul. 25, 2008).

Notification of Transmittal of the International Search Report and the Written Opinion of the International Searching Authority, or the Declaration for International Application No. PCT/US06/41451 (Jul. 7, 2008).

Decision to Grant a European Patent Pursuant to Article 97(1) EPC for European Patent No. 1269764 (Jun. 5, 2008).

Office Action for U.S. Appl. No. 11/120,324 (Apr. 16, 2008).

Final Official Action for U.S. Appl. No. 09/627,253 (Apr. 4, 2008).

Notification of Transmittal of the International Search Report and the Written Opinion of the International Searching Authority, or the Declaration for International Application No. PCT/US06/13404 (Oct. 5, 2007).

Official Action for U.S. Appl. No. 09/627,253 (Sep. 20, 2007).

Restriction/Election Requirement for U.S. Appl. No. 09/627,253 (Jun. 14, 2007).

Communication pursuant to Article 96(2) EPC corresponding to European application No. 01 920 654.9 dated May 2, 2007.

Notice of Panel Decision for U.S. Appl. No. 09/627,253 (Apr. 2, 2007).

Notice of Allowance and Fee(s) Due for U.S. Appl. No. 10/798,924 (Oct. 3, 2006).

Official Action for U.S. Appl. No. 09/627,253 (August 25, 2006).

Notification of Transmittal of the International Search Report and the Written Opinion of the International Searching Authority, or the Declaration for International Application No. PCT/US05/08307 (Mar. 13, 2006).

Official Action for U.S. Appl. No. 10/798,924 (Feb. 23, 2006).

Advisory Action for U.S. Appl. No. 09/627,253 (Dec. 28, 2005).

Final Official Action for U.S. Appl. No. 09/627,253 (Jun. 2, 2005).

Official Action for U.S. Appl. No. 09/627,253 (May 19, 2004).

Restriction/Election Requirement for U.S. Appl. No. 09/627,253 (Jan. 9, 2004).

Official Action for U.S. Appl. No. 09/627,253 (Apr. 28, 2003).

Interview Summary for U.S. Appl. No. 09/627,253 (Jan. 30, 2003).

"3rd Generation Partnership Project; Technical Specification Group Services and Systems Aspects; Network Architecture (Release 5)," 3GPP TS 23.002, V5.7.0, p. 1-50, (Jun. 2002).

*Ex parte Quayle* for U.S. Appl. No. 09/627,253 (May 7, 2009).

Communication regarding the expiry of the time limit within which notice of opposition may be filed for European Application No. 01920654.9 dated May 7, 2009.

Official Action for U.S. Appl. No. 11/586,423 (Apr. 29, 2009).

Official Action for U.S. Appl. No. 11/120,324 (Jan. 21, 2009).

Notice of Allowance and Fee(s) Due for U.S. Appl. No. 09/627,253 (Jul. 24, 2009).

Commonly-assigned, co-pending U.S. Appl. No. 12/484,857 for "Methods, Systems, and Computer Readable Media for Providing Presence Data From Multiple Presence Information Providers," (Unpublished, filed Jun. 15, 2009).

Official Action for U.S. Appl. No. 11/120,324 (Oct. 19, 2009).

Interview Summary for U.S. Appl. No. 11/586,423 (Oct. 15, 2009).

Commonly assigned, co-pending U.S. Divisional Patent Application for "Presence Registration and Routing Node," (Unpublished, filed Apr. 19, 2010).

Notification of Transmittal of the International Search Report and the Written Opinion of the International Searching Authority, or the Declaration of PCT/US2009/047391 (Jan. 25, 2010).

Interview Summary for U.S. Appl. No. 11/120,324 (Mar. 11, 2010).

European Search Report for European application No. 08153801.9 (Jan. 27, 2010).

Official Action for U.S. Appl. No. 11/586,423 (Jan. 6, 2010).

Commonly-assigned, co-pending U.S. Appl. No. 12/624,974 for "Methods, Systems, and Computer Readable Media for Providing Geo-Location Proximity Updates to a Presence System," (Unpublished, filed Nov. 24, 2009).

Wideberg et al., "Deriving Traffic Data From a Cellular Network," World Congress on Intelligent Transport System and Services. World Congress on Intelligent Transport System and Sevices (13). Num. 13. Londres, UK. Ertico. (2006).

Klyne, et al., "Common Presence and Instant Messaging (CPIM): Message," Network Working Group, RFC 3862, p. 1-23 (Aug. 2004).

Peterson, J., "Common Profile for Instant Messaging (CPIM)," Network Working Group, RFC 3860 (Aug. 2004).

Rosenberg et al., "SIP: Session Initiation Protocol," Network Working Group, FRC 3261 (Jun. 2002).

Saraswat et al., "The Presence Protocol," Internet-Draft, draft-saraswat-presenceprotocol-00.txt, p. 1-15 (Feb. 26, 1999).

Rosenberg et al., "SIP for Presence," IETF, draft-rosenberg-sip-pip-00.txt, p. 1-22 (Nov. 13, 1998).

Notice of Allowance and Fee(s) Due for U.S. Appl. No. 11/586,423 (Oct. 6, 2010).

European Search Report for European application No. 06826548.7 (Sep. 3, 2010).

Final Official Action for U.S. Appl. No. 11/120,324 (Jun. 22, 2010).

Communication purusant to Article 94(3) EPC for European application No. 08153801.9 (May 28, 2010).

\* cited by examiner

US 7,933,608 B2

METHODS, SYSTEMS, AND COMPUTER PROGRAM PRODUCTS FOR PROVIDING PRESENCE GATEWAY FUNCTIONALITY IN A TELECOMMUNICATIONS NETWORK

RELATED APPLICATIONS

This application claims the benefit of U.S. Provisional Patent Application Ser. No. 60/552,378, filed Mar. 11, 2004; the disclosure of which is incorporated herein by reference in its entirety.

TECHNICAL FIELD

The subject matter described herein relates to methods, systems, and computer program products for maintaining and delivering presence information. More particularly, the subject matter described herein relates to methods, systems, and computer program products for providing presence gateway functionality for maintaining and delivering presence information in a telecommunications network.

BACKGROUND ART

Presence information refers to contact information concerning a entity, referred to as a presentity, to which other entities can subscribe in a presence server database. For example, if a presentity is a mobile telecommunications subscriber, presence information that is stored for the subscriber may include the current location of the subscriber and whether or not the subscriber's handset is on or off. Another entity or application may subscribe to the presentity by sending a subscribe message to a presence server. The presence server may notify the subscribing entity of the initial presence status of the presentity and of changes in presence status of the presentity.

In some conventional networks that use presence protocols, a subscriber is required to have a general packet radio service (GPRS) handset with a presence client running on the handset in order for the presence information for the subscriber to be updated in the presence server database. For example, when a subscriber with a GPRS handset activates his or her handset in a new location area, the presence client on the subscriber's handset may automatically send a message to the presence database indicating that the subscriber is located in a particular area and that the subscriber's handset is activated.

Requiring that each subscriber have a presence client running on his or her handset in order for presence information to be collected prevents the development of universal-applicable applications that rely on presence information. For example, not all subscribers have GPRS handsets, not to mention GPRS handsets with presence clients. Accordingly, applications, such as SMS, push-to-talk, instant messaging, and conference calling, that rely on presence information are limited to subscribers with specialized communications equipment. Stated differently, because presence information is not available regarding all types of subscribers, including subscribers without GPRS handsets, the applicability of applications that rely on presence information is limited.

Another problem with current presence implementations is that presence information is only maintained for subscribers who are currently subscribed to by other entities. If a subscriber is not currently subscribed to, presence information may not be stored in a presence server database for that subscriber. As a result, when a subscriber becomes subscribed to, there may be delay between the time that presence information is obtained and delivered to the subscribing entity.

Accordingly, in light of these difficulties associated with conventional presence implementations, there exists a need for improved methods, systems, and computer program products for providing presence gateway functionality in a telecommunications network.

SUMMARY

According to one aspect of the subject matter described herein, a method for maintaining and delivering presence information regarding telecommunications network subscribers includes deriving presence information for a first set of telecommunications network subscribers based on telecommunications signaling messages relating to communications to or from members of the first set of subscribers. The first set of subscribers may include a set of potential presentities that represents subscribers who may or may not be subscribed to by other entities. Based on the telecommunications signaling messages, it is determined whether the presence status associated with a subscriber in the first set has changed. In response to determining that the presence status has changed, it is determined whether the subscriber is a subscribed-to presentity. If the subscriber is determined to be a subscribed-to presentity, the presence server is notified of the change in presence status of the subscriber.

Because the subject matter described herein derives and maintains presence information for a first set of subscribers that includes subscribed-to presentities and non-subscribed-to presentities, when a subscriber in the set becomes a subscribed-to presentity, the time for distributing the presence information to the presence server and to the subscribers or applications seeking information regarding the presentity is reduced. As a result, the subject matter described herein reduces the time required for collecting and delivering presence information over conventional presence implementations.

The subject matter described herein for deriving and maintaining presence information may be implemented using hardware, software, firmware, or any combination thereof. In one exemplary implementation, the subject matter described herein may be implemented using a computer program product comprising computer executable instructions embodied in a computer readable medium. Exemplary computer readable media suitable for implementing the subject matter described herein includes chip memory devices, disk storage devices, application specific integrated circuits, and programmable logic devices.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
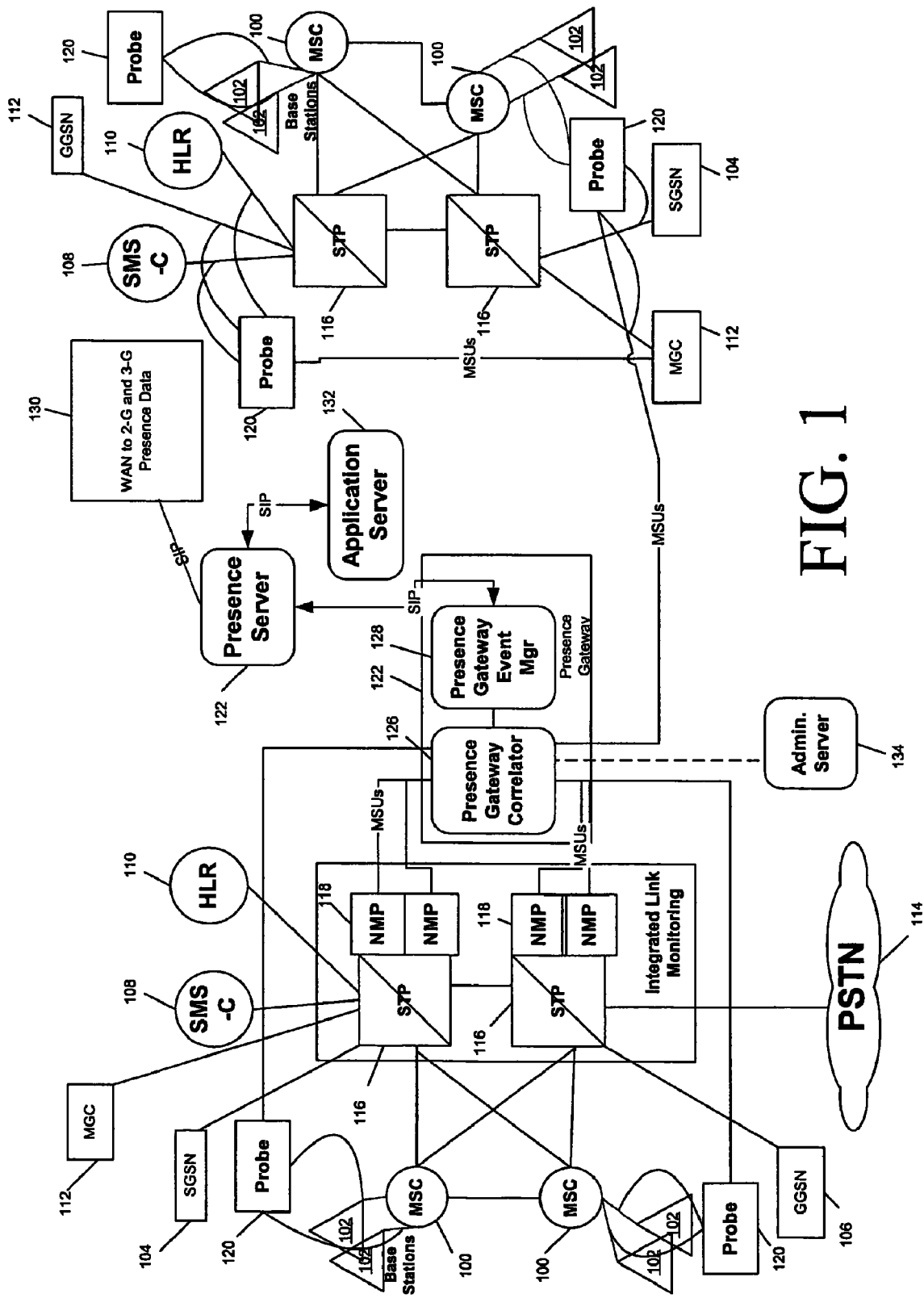
FIG. 1 is a network diagram illustrating an exemplary architecture for collecting signaling messages, deriving presence information regarding subscribed-to presentities and non-subscribed-to presentities based on the signaling messages, and delivering presence information to a presence server according to an embodiment of the subject matter described herein.

The subject matter described herein includes a presence gateway that manages potential presentity information, derives presence information from telecommunications signaling messages from a plurality of different nodes in the network, maintains presence information for both subscribed-to and non-subscribed-to presentities, and delivers presence information for subscribed-to presentities to a presence server. FIG. 1 illustrates a telecommunications network including a presence gateway according to an embodiment of the subject matter described herein. Referring to FIG. 1, the illustrated telecommunications network includes a plurality of nodes that exchange signaling messages in order to set up and tear down calls and send SMS messages. In the illustrated example, the telecommunications network includes mobile switching centers (MSCs) 100 and base stations 102 for enabling communication with wireless mobile subscribers. Similarly, serving GPRS support node (SGSN) 104 and gateway GPRS support node (GGSN) 106 enable communication with GPRS wireless mobile subscribers. A short message service center (SMS-C) 108 stores SMS messages and forwards the SMS messages to their intended destinations. A home location register (HLR) 110 stores mobile subscription and mobile subscriber location information.

A media gateway controller (MGC) 112 controls one or more media gateways (not shown in FIG. 1) for calls over packet networks. MGC 112 also performs call setup signaling to establish and tear down voice over IP calls. PSTN 114 includes traditional wireline components to establish and tear down calls with wireline subscribers. For example, PSTN 114 may include one or more end office switches, databases, and other nodes that perform the signaling necessary to establish and tear down wireline calls.

Signal transfer points 116 route signaling messages between other nodes in the network. For example, signaling transfer points 116 may route SS7 signaling messages based on SS7 point codes. Signal transfer points 116 may also route IP telephony signaling messages based on IP addresses. Examples of IP telephony signaling messages that may be routed by STPs 116 include SIP messages, MGCP messages, and SS7 over IP messages.

The nodes on the right hand side of FIG. 1 perform the same functions as the correspondingly numbered nodes on the left hand side of FIG. 1. Accordingly, a description thereof will not be repeated herein. One difference between the nodes illustrated on the right hand side of FIG. 1 and the nodes illustrated on the left hand side is that on the left hand side, STPs 116 include integrated link monitors 118, whereas messages traversing STPs 116 on the right hand side are monitored through stand-alone link monitoring probes 120. STPs 116 having integrated link monitors 118 may include message copy functions located on each interface card within the STP. The message copy functions forward copies of received messages to network monitoring processors 118. Network monitoring processors 118 buffer message copies and forward the message copies to downstream applications. External network monitoring probes 120 include hardware and software that non-intrusively copy messages that traverse signaling links between various network nodes. One example of a commercially-available system suitable for implementing probes 118 and 120 is the Sentinel™ system available from Tekelec of Calabasas, Calif.

According to an aspect of the subject matter described herein, a presence gateway 122 receives signaling messages copied by probes 118 and 120, generates presence information regarding non-subscribed-to presentities and subscribed-to presentities, and forwards presence information for subscribed-to presentities to a presence server 124. In the illustrated example, presence gateway 122 includes a presence gateway correlator 126 for correlating messages relating to the same transaction or subscriber and a presence gateway event manager 128 for notifying presence server 124 of changes in presence status of a subscribed-to presentity.

Presence server 124 may receive presence status information from presence gateway 122 and from 2G and 3G networks 130. Presence server 124 may also provide presence information to one or more application servers 132. Application server 132 may implement one or more applications that use presence information. Examples of such applications may include SMS, push-to-talk, instance messaging, and conference calling.

An administration server 134 allows operators to provision a potential presentity database maintained by presence gateway 122. Administration server 134 may also allow operators to control messages collected by probes 118 and 120. For example, administration server 134 may allow an operator to define message filters used by probes 118 and 120 to identify messages of interest.

Figure 2:
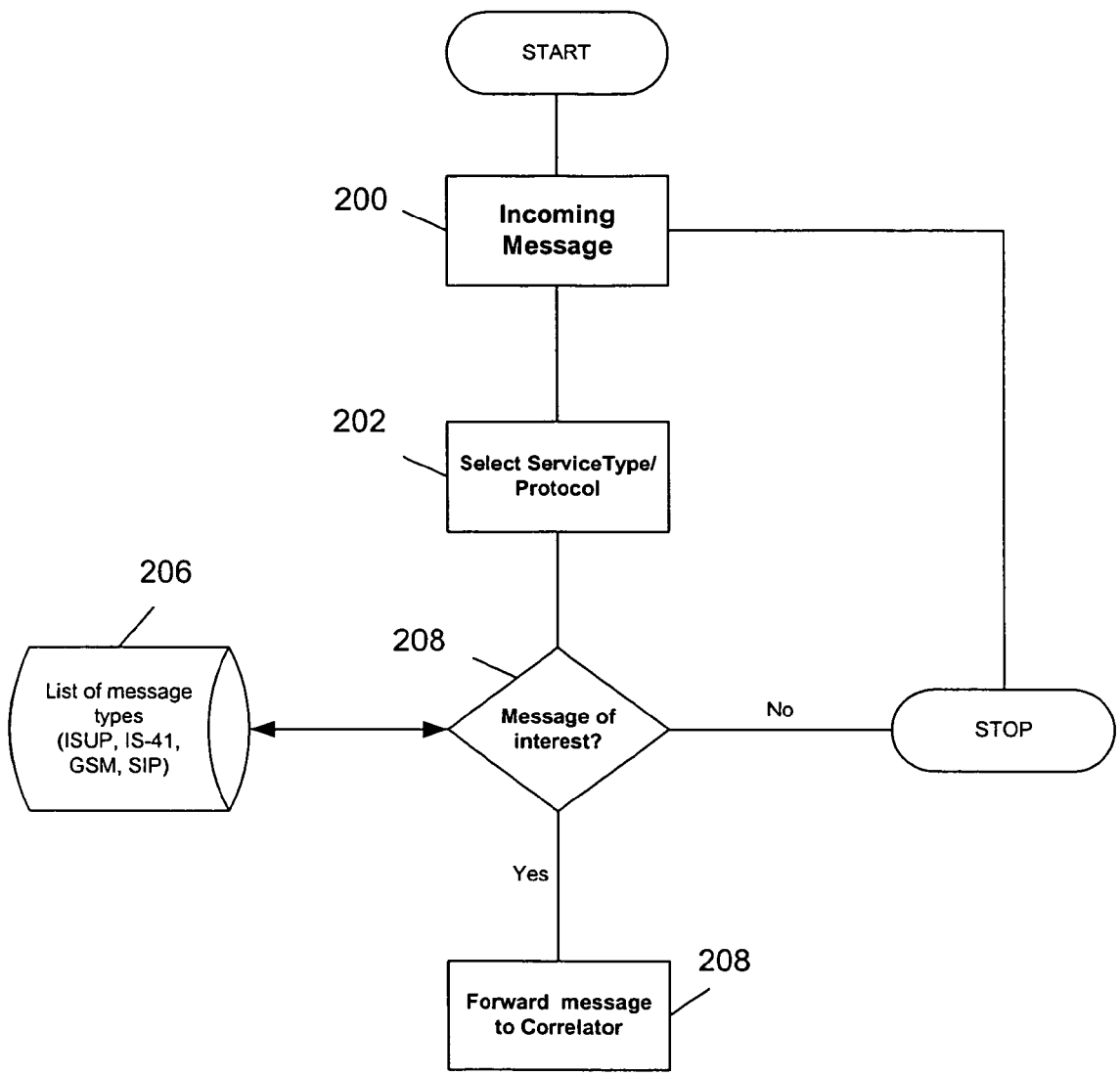
FIG. 2 is a flow chart illustrating exemplary steps for filtering signaling messages to be delivered to a presence gateway correllator according to an embodiment of the subject matter described herein.

FIG. 2 is a flow chart illustrating exemplary steps that may be performed by network monitoring probes 118 and 120 in screening signaling messages and forwarding the signaling messages to presence gateway correlator 126. Referring to FIG. 2, in step 200, a message is received by a probe 118 or 120. In step 202, the probe determines the service or protocol type of the message. Determining the service or protocol type may include determining whether the message is an ISUP, IS-41, GSM, SIP, MGCP, GPRS or other type of message. In step 204, it is determined whether the message is a message of interest. Determining whether the message is a message of interest may include comparing the determined message type to a list 206 of provisioned message types. List 206 may be provisioned by an operator via administration server 134 illustrated in FIG. 1. If the message is determined to be a message of interest, control proceeds to step 208 where the message is forwarded to presence gateway correlator 126. If the message is determined not to be a message of interest, processing ends for this message and control returns to step 200 where the next message received by the probe is processed.

Figure 3:
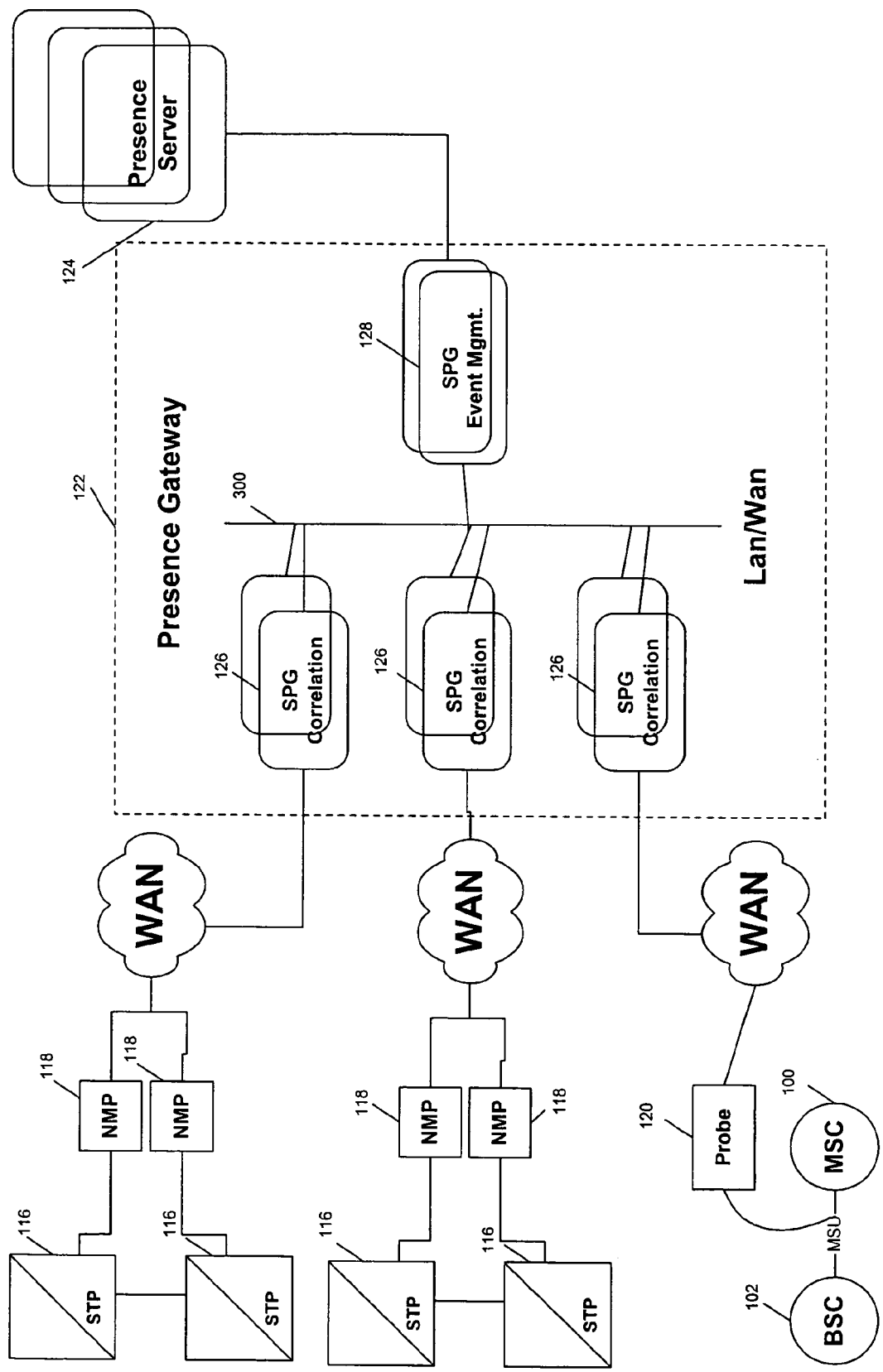
FIG. 3 is a block diagram illustrating a distributed architecture for a presence gateway according to an embodiment of the subject matter described herein.

FIG. 3 is a block diagram illustrating a distributed implementation of presence gateway 122. In FIG. 3, presence gateway 122 includes a plurality of presence gateway correlators 126 connected to a single presence gateway event manager 128 via a LAN/WAN 300. Each presence gateway correlator 126 receives messages of interest from probes 118 and 120. Presence gateway event manager 128 receives events detected by each correlator and forwards the events relating to subscribed-to presentities to presence server 124.

Figure 4:
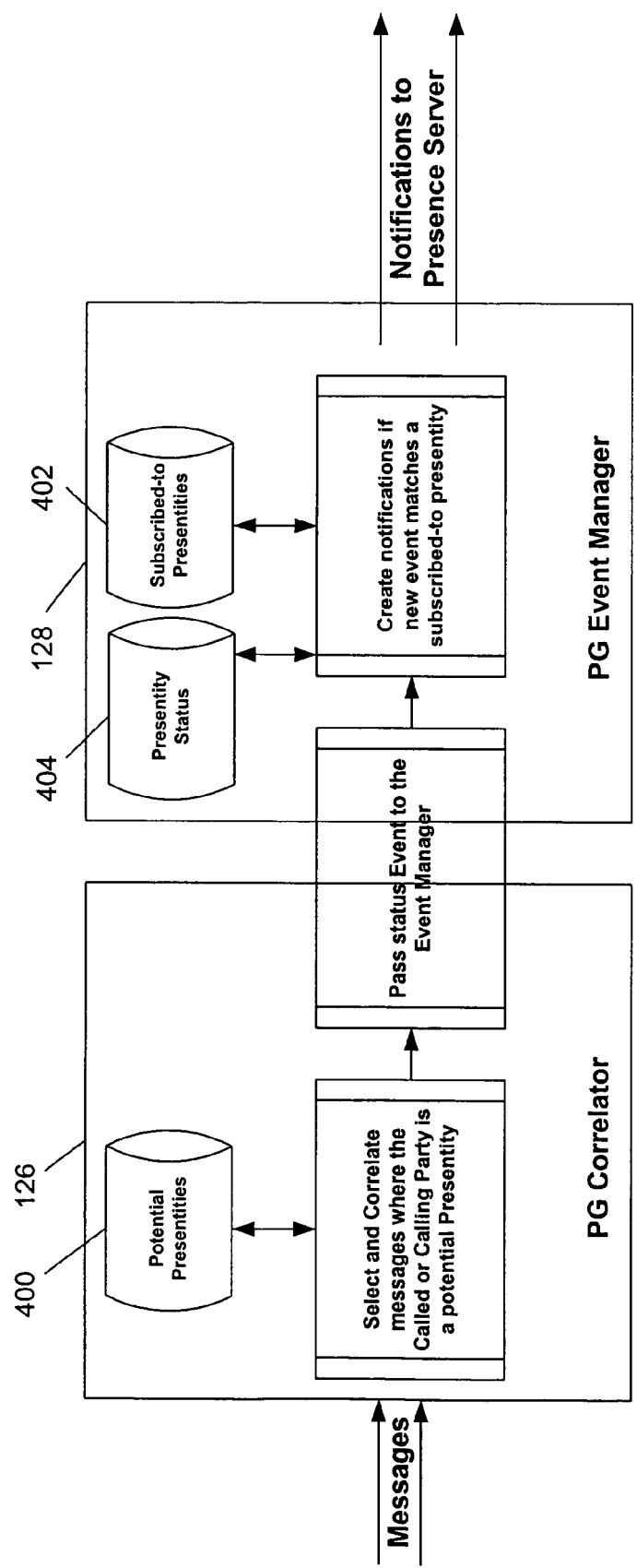
FIG. 4 is a block diagram illustrating exemplary functional components of a presence gateway according to an embodiment of the subject matter described herein.

FIG. 4 illustrates an exemplary architecture for presence gateway 122 in more detail. Referring to FIG. 4, presence gateway correlator 126 includes a database 400 of potential presentities. As described above, potential presentities may include subscribed-to presentities and non-subscribed-to presentities representing the universe of subscribers for which a service provider may desire to obtain presence information. Because correlator 126 stores presence information regarding potential presentities who are not subscribed-to presentities, the delivery of presence information regarding these subscribers can be expedited over conventional presence implementations where presence information is collected only for subscribed-to presentities. That is, because correlator 126 derives and caches presence information for non-subscribed-to presentities, presence information for these entities can be readily obtained when a subscription to one of the entities occurs.

In the illustrated example, presence gateway correlator 126 selects and correlates messages where the called or calling party is a potential presentity, detects events regarding potential presentities, and passes the events to event manager 128. Event manager 128 includes a database 402 of subscribed-to presentities. Subscribed-to presentities may be subscribers whose presence status is currently being monitored by another subscriber or application. Entries in subscribed-to presentity database 402 may be dynamically updated based on SIP subscription messages and subscription cancellation messages from presence server 124. If an entity is a subscribed-to presentity and an event occurs that results in a change in presence status for a subscribed-to presentity, event manager 128 may send a notification to presence server 124.

Although in the example illustrated in FIG. 4, separate databases are shown for storing information regarding potential presentities and subscribed-to presentities, the subject matter described herein is not limited to a two-database implementation. In an alternate implementation, databases 400 and 402 can be combined without departing from the scope of the subject matter described herein.

Figure 5:
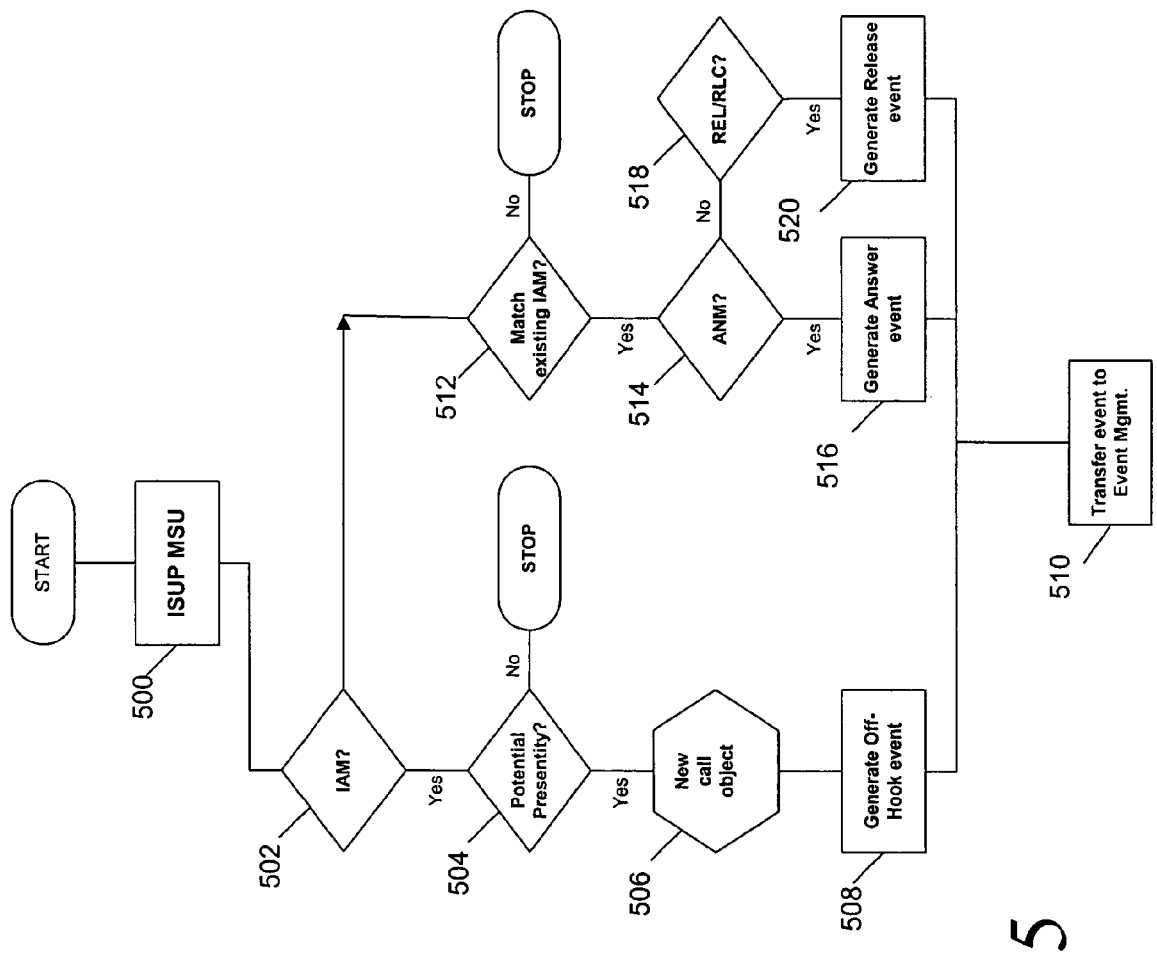
FIG. 5 is a flow chart illustrating exemplary steps for deriving presence information for potential presentities based on ISUP messages according to an embodiment of the subject matter described herein.

One type of message for which it may be desirable to derive presence information is ISDN user part (ISUP) messages. FIG. 5 is a flow chart illustrating exemplary steps that may be performed by presence gateway correlator 126 in correlating ISUP messages according to an embodiment of the subject matter described herein. Referring to FIG. 5, in step 500, presence gateway correlator 126 receives an ISUP message. In step 502, it is determined whether the message is an initial address message (IAM). If the message is IAM message, control proceeds to step 504 where it is determined whether the IAM message concerns a potential presentity. This step may be performed by comparing the calling party in the IAM message to potential presentities stored in database 400. If the IAM message does not concern a potential presentity, correlation processing for this message stops.

If the IAM message concerns a potential presentity, control proceeds to step 506 where a new call object is created. The call object may be a data structure stored by correlator 126 relating to a call from the potential presentity. Because an IAM message represents call initiation, control proceeds to step 508 where correlator 126 generates an off hook event. An off hook event may be used to notify presence server that a subscriber is currently on the phone and therefore currently unable to receive other voice communications. In step 510, correlator 126 communicates the off hook event to event manager 128.

Returning to step 502, if the ISUP message is determined to be a message other than an IAM message, control proceeds to step 512 where it is determined whether the non-IAM message matches an existing IAM message. Determining whether a non-IAM message matches an existing IAM may include comparing the originating point code (OPC), destination point code (DPC), and circuit identifier code (CIC) to existing call objects. If the message does not match an existing IAM message, correlation processing stops for this message. If the message matches an existing IAM message, control proceeds to step 514 where it is determined whether the message is an answer message (ANM). If the message is an answer message, control proceeds to step 516 where an answer event is generated and step 510 where the event is transferred to event manager 128.

In step 514, if the message is determined not to be an answer message, control proceeds to step 518 where it is determined whether the message is a release (REL) or release complete (RLC) message. If the message is a release or release complete message, control proceeds to step 520 where a release event is generated. Control then returns to step 510 where the event is transferred to event manager 128.

Figure 6:
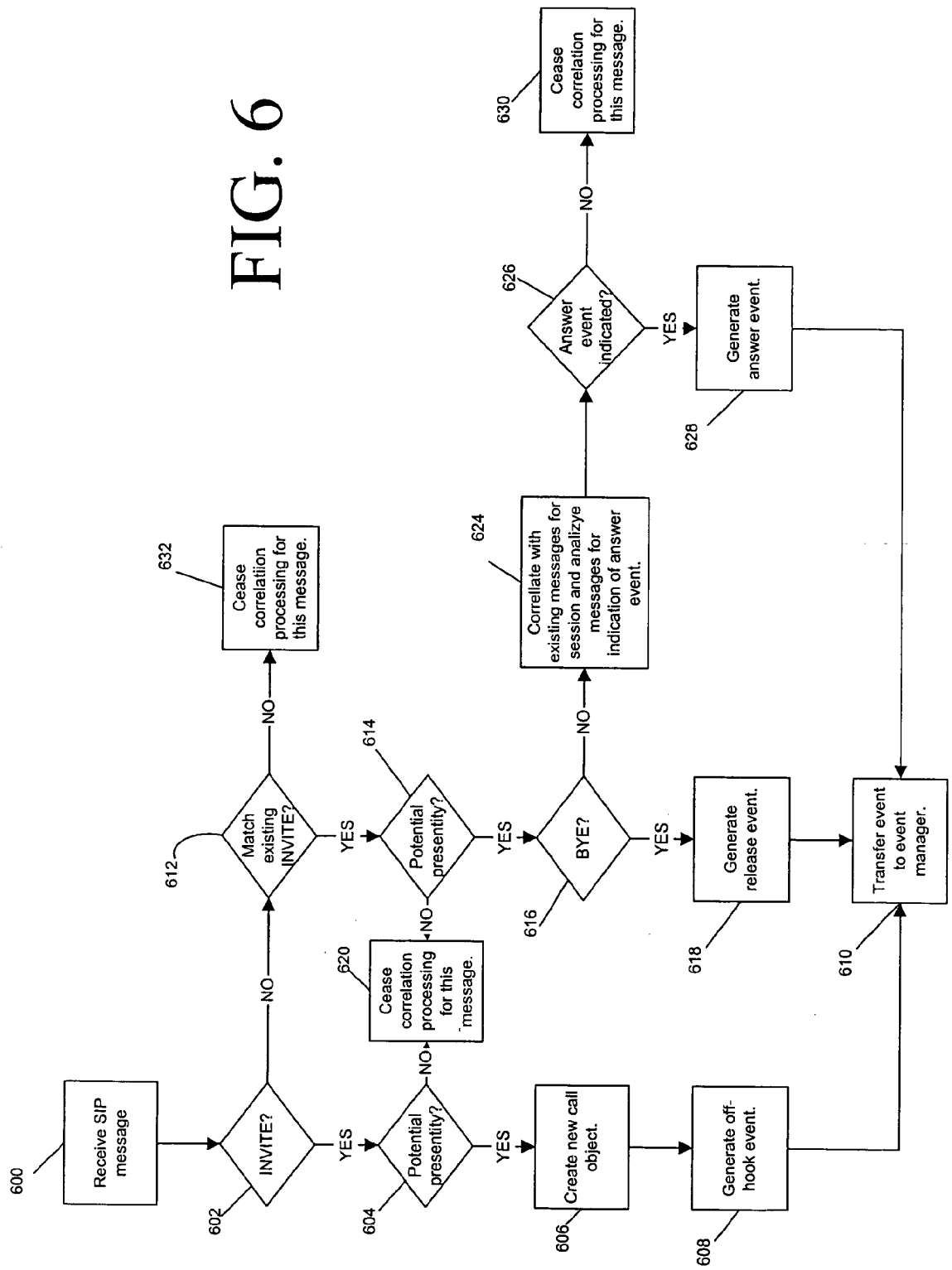
FIG. 6 is a flow chart illustrating exemplary steps for deriving presence information based on SIP messages according to an embodiment of the subject matter described herein.

FIG. 6 is a flow chart illustrating exemplary steps that may be performed by correlator 126 in correlating SIP messages relating to a call origination. Referring to FIG. 6, in step 600, correlator 126 receives a SIP message. In step 602, correlator 126 determines whether the SIP message is an INVITE message. If the message is an INVITE message, control proceeds to step 604 where it is determined whether the INVITE message concerns a potential presentity. If the INVITE message concerns a potential presentity, control proceeds to step 606 where a new call object is created. In step 608, an off-hook event is generated. In step 610, the off-hook event is communicated to event manager 128.

In step 602, if the SIP message is determined not to be an INVITE message, control proceeds to step 612 where it is determined whether the message matches an existing INVITE message. If the message matches an existing INVITE message, control proceeds to step 614 where it is determined whether the message concerns a potential presentity. If the message concerns a potential presentity, control proceeds to step 616 where it is determined whether the message is a BYE message. If the message is a BYE message, control proceeds to step 618 where a release event is generated. Control then proceeds to step 610 where the release event is communicated to event manager 128.

Returning to step 602, if the INVITE message is determined not to concern a potential presentity, correlation processing may cease for this message. Similarly, in step 614, if the non-INVITE SIP message is determined not to concern a potential presentity, control proceeds to step 620 where correlation processing ceases for the message.

Returning to step 616, if the message is determined to not to be a BYE message, control proceeds to step 624 where the message is correlated with other messages that have been received and stored for the session. In step 626, correlator 126 analyzes the received messages for the session for an indication of an answer event. Searching for an indication of an answer event may include looking for a sequence of a Ringing message from the called party SIP proxy to the calling party SIP proxy, a 200 OK message from the called party SIP proxy to the calling party SIP proxy, and an ACK message from the calling party SIP proxy to the called party SIP proxy. If this sequence of messages occurs, an answer event may be indicated. If an answer event is indicated, control proceeds to step 628 where an answer event is generated and to step 610 where the answer event is communicated to event manager 128. Returning to step 626, if an answer event is not indicated, control proceeds to step 630 where correlation processing for the message stops. Similarly, if in step 612 it is determined that the SIP message does not match an existing invite, control proceeds to step 632 where correlation processing for the message ceases.

Figure 7:
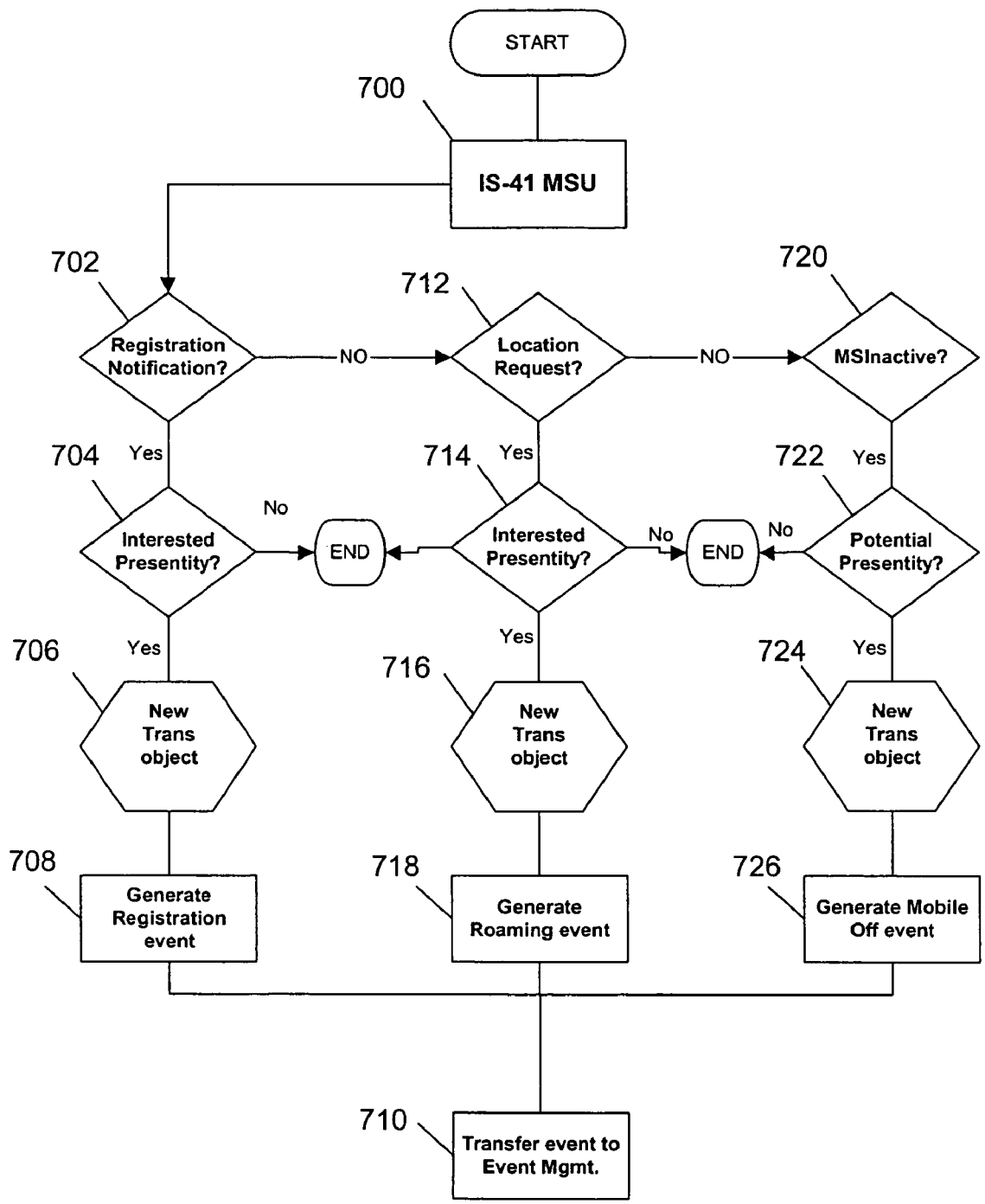
FIG. 7 is a flow chart illustrating exemplary steps for deriving presence information concerning potential presentities based on IS-41 messages according to an embodiment of the subject matter described herein.

Another type of message for which it may be desirable to derive presence information includes IS-41 messages relating to registration, roaming, and de-activation of mobile handsets. FIG. 7 is a flow chart illustrating exemplary steps that may be performed by presence gateway correlator 126 in correlating IS-41 messages and generating presence status information based on the IS-41 messages. Referring to FIG. 7, in step 700, correlator 126 receives an IS-41 message. In step 702, it is determined whether the message is registration notification message. If the message is registration notification message, control proceeds to step 704 where it is determined whether the registration notification message concerns a potential presentity. Determining whether the registration notification message concerns a potential presentity may include comparing the mobile subscriber identifier in the registration notification message with mobile subscriber identification information stored in database 400. If the registration notification message concerns a potential presentity, control proceeds to step 706 where a new transaction object is created. In step 708, correlator 126 generates a registration event. In step 710, correlator 126 communicates the registration event to event manager 128.

Returning to step 702, if the IS-41 message is determined not to be a registration notification message, control proceeds to step 712 where it is determined whether the IS-41 message is a location request message. If the message is determined to be a location request message, control proceeds to step 714 where it is determined whether the location request message concerns a potential presentity. If the location request message concerns a potential presentity, control proceeds to step 716 where a new transaction object is created. In step 718, correlator 126 generates a roaming event. Control then proceeds to step 710 where the roaming event is transferred to event manager 128.

Returning to step 712, if the message is determined not to be a location request message, control proceeds to step 720 where it is determined whether the message is a mobile station inactive message. If the message is determined to be a mobile station inactive message, control proceeds to step 722 where it is determined whether the mobile station inactive message concerns a potential presentity. If the message concerns a potential presentity, control proceeds to step 724 where a new transaction object is created. In step 726, correlator 126 generates a mobile off event indicating that the handset for the potential presentity has been deactivated. Control then proceeds to step 710 where correlator 126 transfers the handset off event to event manager 128.

In step 720, if the message is determined not to be a mobile station inactive event, correlation processing for this message ends. Similarly, in step 722, if the message is determined not to relate to a potential presentity, correlation processing for the message ends.

Figure 8:
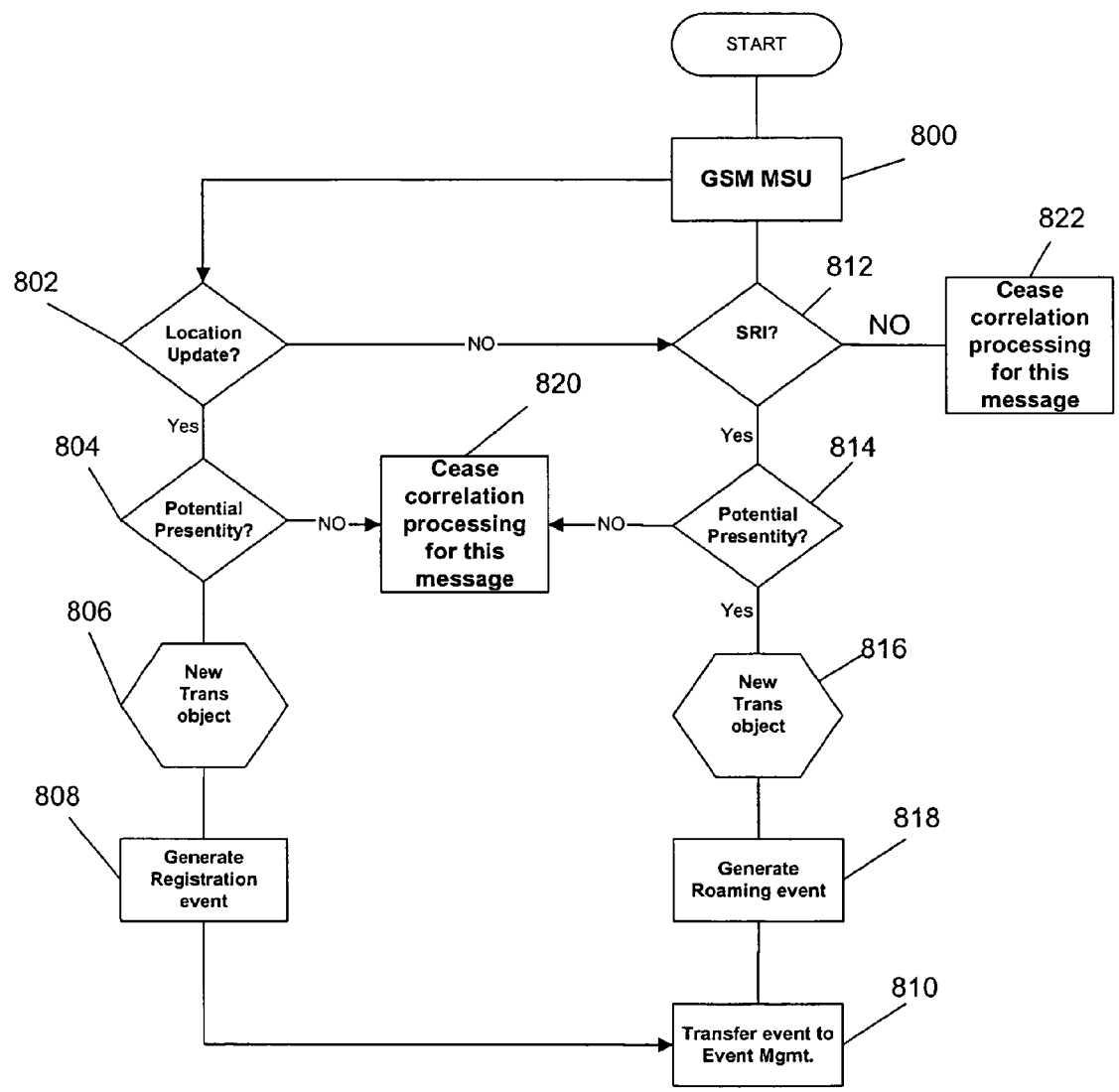
FIG. 8 is a flow chart illustrating exemplary steps for deriving presence information concerning potential presentities based on GSM messages according to an embodiment of the subject matter described herein.

Yet another type of message for which it may be desirable to derive presence information includes GSM messages relating to registration and roaming. FIG. 8 is a flow chart illustrating exemplary steps that may be performed by correlator 126 in generating events based on GSM messages according to an embodiment of the subject matter described herein. Referring to FIG. 8, in step 800, correlator 126 receives a GSM message. In step 802, correlator 126 determines whether the GSM message is a location update message. If the GSM message is a location update message, control proceeds to step 804 where it is determined whether the message concerns a potential presentity. Determining whether the message concerns a potential presentity may include determining whether the IMSI or MSISDN number in the message corresponds to an IMSI or MSISDN number stored in potential presentities database 400. If the location update message concerns a potential presentity, control proceeds to step 806 where a new transaction object is created. In step 808, a registration event is generated. In step 810, correlator 126 communicates the registration event to event manager 128.

Returning to step 802, if it is determined that the GSM message is not a location update message, control proceeds to step 812 where it is determined whether the message is a send routing information (SRI) message. If the message is determined to be an SRI message, control proceeds to step 814 where it is determined whether the SRI message concerns a potential presentity. Determining whether the SRI message concerns a potential presentity may include comparing the IMSI or MSISDN number from the SRI message to entries in database 400 to determine whether the IMSI or MSISDN matches any of the entries. If the SRI message is determined to concern a potential presentity, control proceeds to step 816 where a new transaction object is created. In step 818, correlator 126 generates a roaming event. In step 810, correlator 126 communicates the roaming event to event manager 128.

Returning to step 804 or step 814, if the location update or SRI message does not concern a potential presentity, control proceeds to step 820 where correlation processing for the message ceases. Similarly, in step 812, if it is determined that the message is not an SRI message or a location update message, correlation processing for the message ends (step 822).

Although the example illustrated in FIG. 8 includes identifying registration and roaming events based on GSM registration and location management messages, the subject matter described herein is not limited to identifying only these types of events or using only these types of messages. For example, similar procedures may be used to analyze mobile application part (MAP) or short message point to point (SMPP) messages to determine whether a potential presentity is available to receive SMS messages and the current location of the subscriber where the SMS messages can be delivered. Similarly, IS-41 messages relating to SMS delivery may be used to determine whether an IS-41 potential presentity is available to receive SMS messages and the current location of the IS-41 potential presentity where the SMS messages can be delivered.

Figure 9:
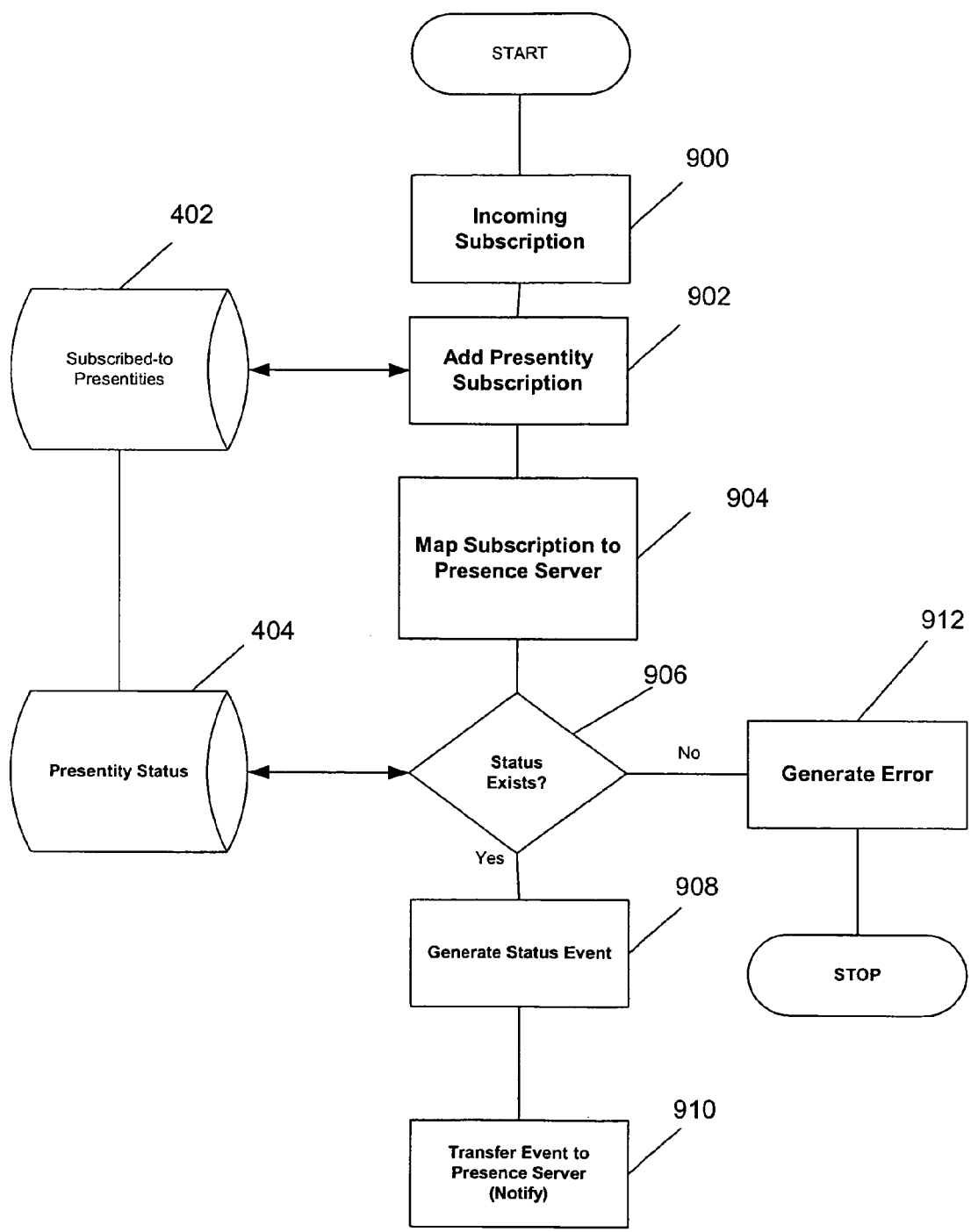
FIG. 9 is a flow chart illustrating exemplary steps for managing presence subscription information at a presence gateway according to an embodiment of the subject matter described herein.

As stated above, event manager 128 receives subscriptions from presence server 124 and manages subscriptions in subscribed-to presentity database 402. FIG. 9 is a flow chart illustrating exemplary steps that may be performed by event manager 128 in managing subscriptions according to an embodiment of the subject matter described herein. Referring to FIG. 9, in step 900, event manager 128 receives a subscribe message from presence server 124. In step 902, event manager 128 adds a subscription to subscribed-to presentity database 402. In step 904, event manager 128 maps the subscription to the presence server that generated the subscription.

In step 906, event manager 128 determines whether presence status information exists for the subscribed-to presentity. Determining whether presence status exists may include accessing presentity status database 404. If status information exists, control proceeds to step 908 where event manager 128 generates a status event. In step 910, event manager 128 transfers the status event to presence server 124. Returning to step 906, if presence status information does not exist for a new subscription, control proceeds to step 912 where an error condition is generated. The error condition may notify the operator that status information is not available for the subscriber.

Figure 10:
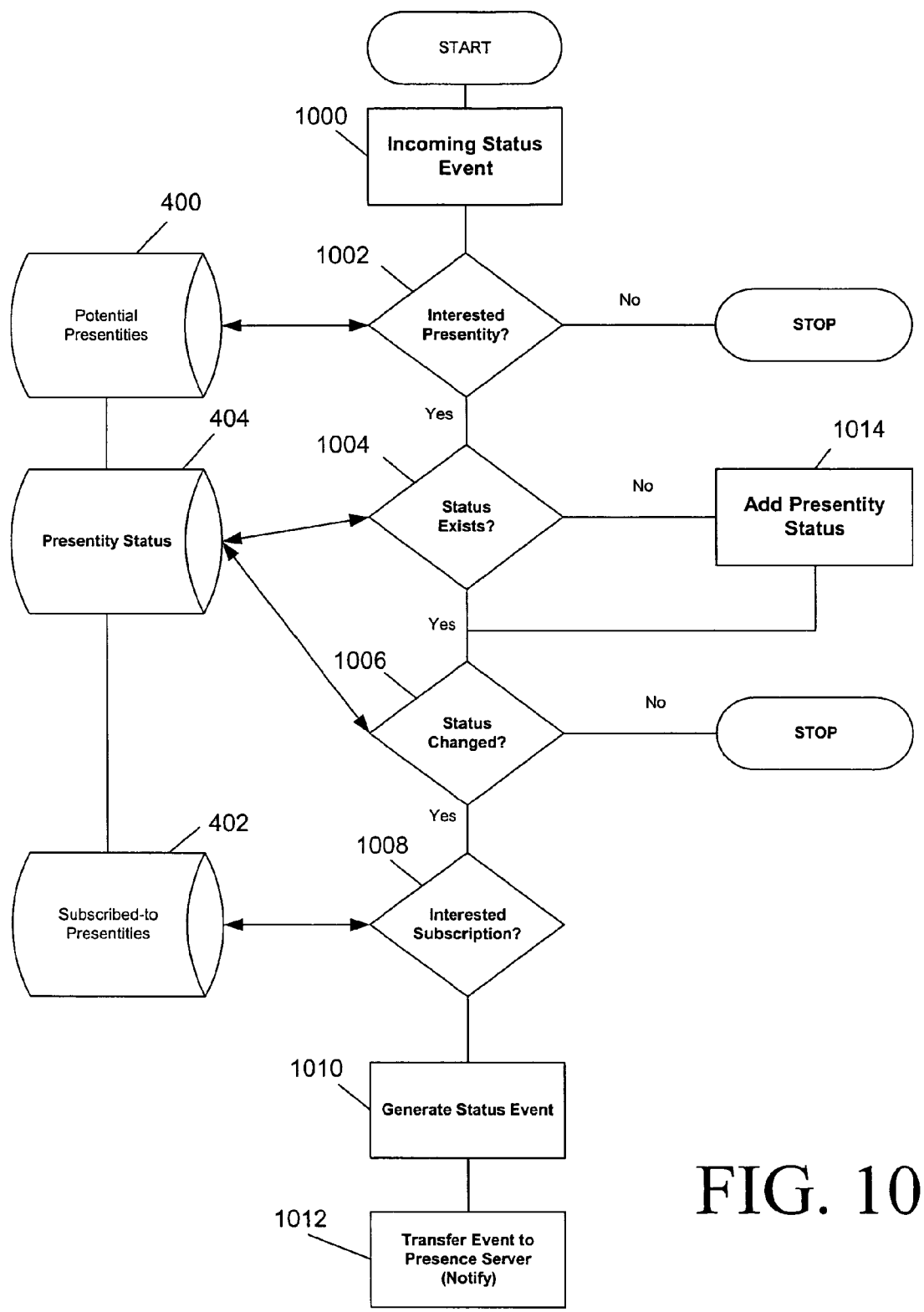
FIG. 10 is a flow chart illustrating exemplary steps that may be performed in managing events at a presence gateway according to an embodiment of the subject matter described herein.

As described above, another function performed by event manager 128 is receiving events from correlator 126 and notifying presence server 124 of events that relate to subscribed-to presentities. FIG. 10 is a flow chart illustrating exemplary steps performed by event manager 128 in generating presence information and transferring the presence information to presence server 124. Referring to FIG. 10, in step 1000, an incoming status event is detected. In step 1002, it is determined whether the status event concerns a potential presentity. The step of determining whether the event concerns a potential presentity allows event manager 128 to associate event status with potential presentities without requiring that correlator 126 communicate potential presentity information along with the event to event manager 128. In an alternate implementation, correlator 126 may communicate potential presentity information to event manager 128 along with each event, and step 1002 in FIG. 10 may be eliminated. If the event concerns a potential presentity, control proceeds to step 1004 where it is determined whether event status exists for the potential presentity. If event status exists, control proceeds to step 1006 where it is determined whether the status has changed. If the status has changed, control proceeds to step 1008 where it is determined whether the status concerns a subscribed-to presentity. If the event concerns a subscribed-to presentity, control proceeds to step 1010 where a status event is generated. In step 1012, the status event is transferred to present server 124.

Returning to step 1002, if the status event does not concern a potential presentity, presence processing for the status event stops. In step 1004, if presence status does not exist for a potential presentity, control proceeds to step 1014 where presentity status is added to presentity status database 404. Storing presence status for potential presentities including presentities who are not currently subscribed to decreases the time for obtaining presence information when a new subscription occurs over conventional presence implementations. In step 1006, if it is determined that the status has not changed, presence event processing ceases.

Figure 11:
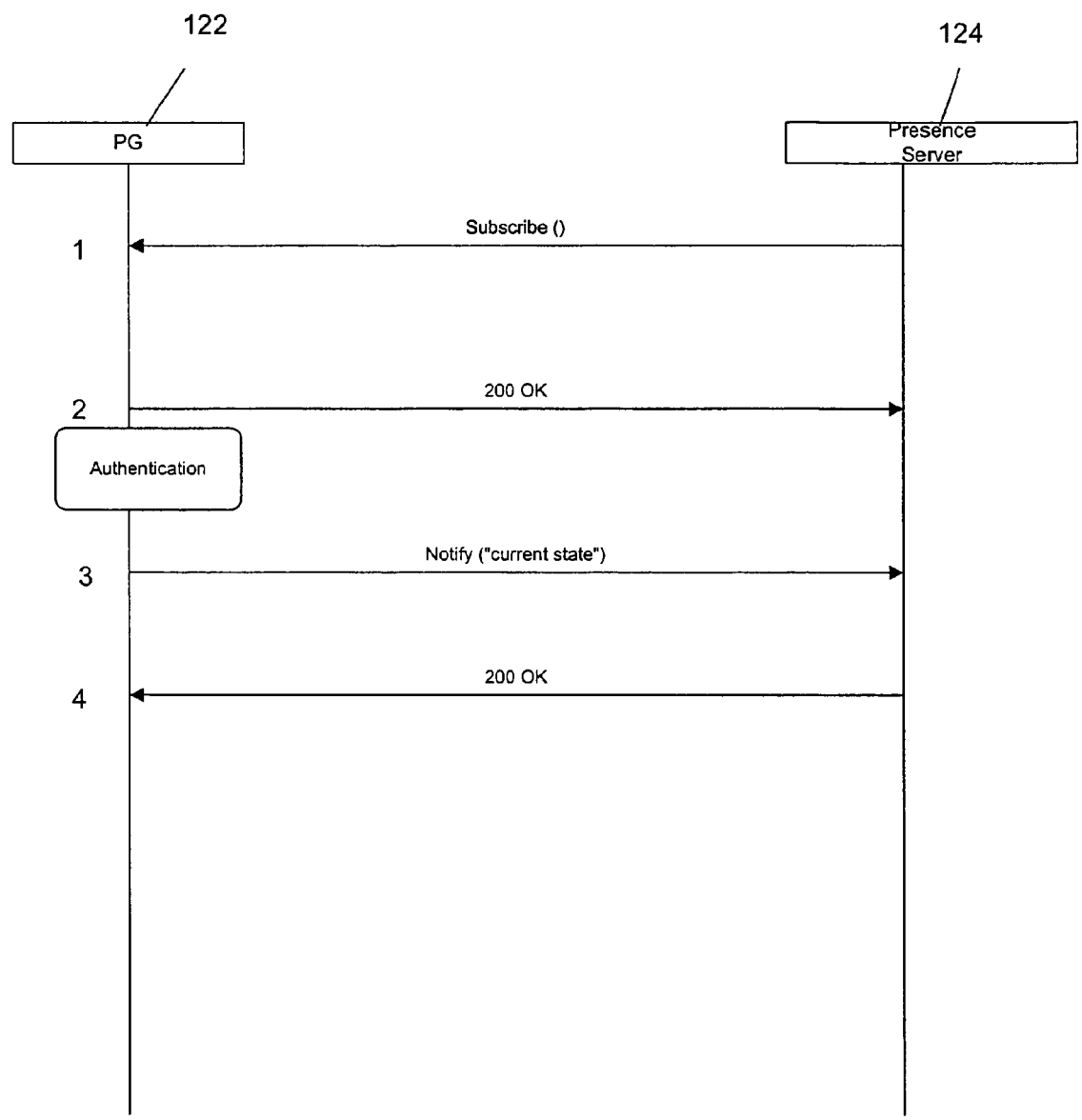
FIG. 11 is a message flow diagram illustrating exemplary messages for transferring subscription information from a presence server to a presence gateway according to an embodiment of the subject matter described herein.

In one exemplary implementation, subscription information is transferred from presence server 124 to presence gateway 122 using SIP messages. FIG. 11 is a flow chart illustrating exemplary SIP messages that may be exchanged between presence server 124 and presence gateway 122 in creating a new subscription. Referring to FIG. 11, in line 1 of the message flow diagram, when an entity subscribes to a potential presentity, presence server 124 sends a subscribe message to presence gateway 122. In response to the subscribe message, presence gateway 122 authenticates the presence server. If the presence server passes the authentication, in line 2 of the message flow diagram, presence gateway 122 sends a SIP 200 OK message to presence server 124.

In line 3 of the message flow diagram, presence gateway 122 sends a Notify message indicating the current state of the subscribed-to presentity. In line 4 of the message flow diagram, presence server 124 sends a 200 OK message to presence gateway 122 confirming receipt of the Notify message.

As stated above, because presence gateway 122 maintains presence information regarding potential presentities who are not currently subscribed-to presentities, the time for obtaining status information when a potential presentity becomes a subscribed-to presentity is decreased over presence implementations where presence status information is only maintained for subscribed-to presentities. Using the message flow illustrated in FIG. 11 as an example, once presence gateway 122 receives a new subscription in line 1, presence gateway 122 can send the Notify message in line 3 indicating the current state of the subscribed-to presentity without requiring that the presence information be obtained from the subscriber's handset.

Figure 12:
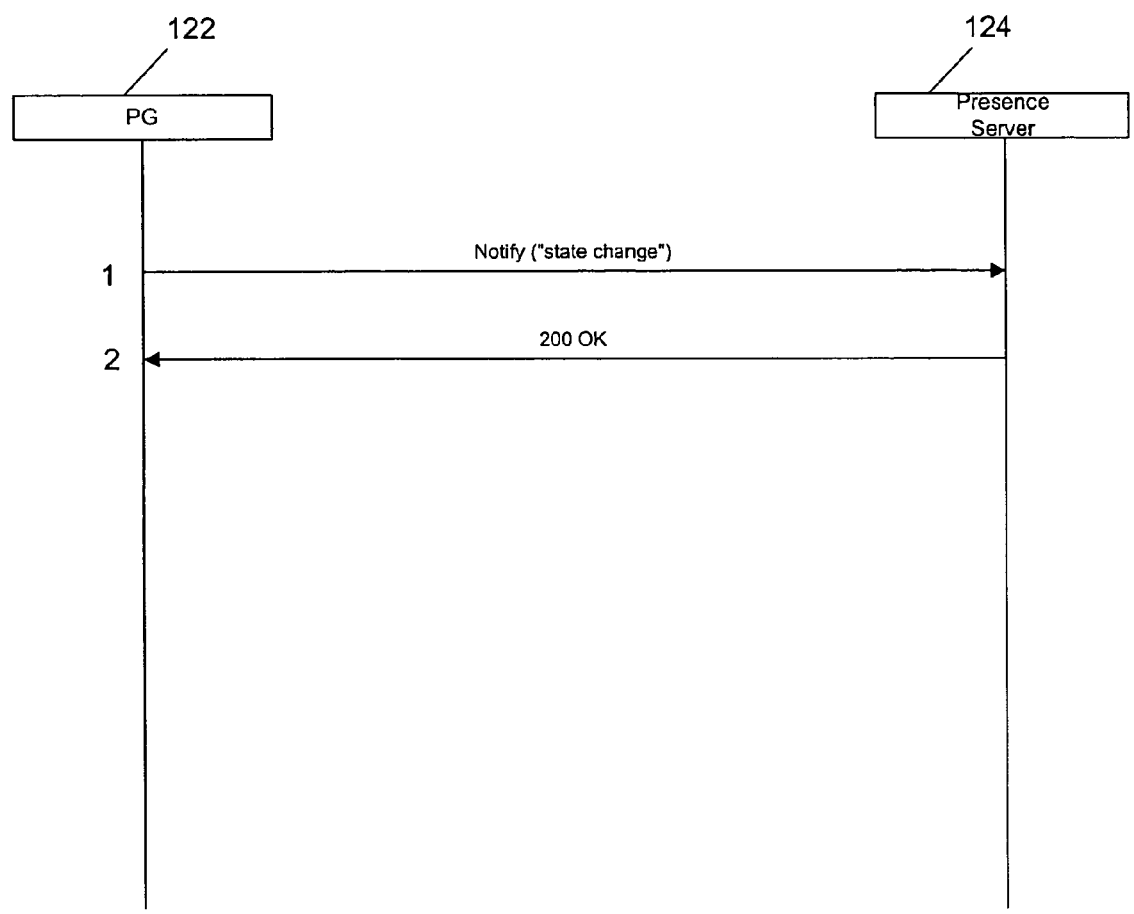
FIG. 12 is a message flow diagram illustrating exemplary messages for delivering presence state information from a presence gateway to a presence server according to an embodiment of the subject matter described herein.

Another feature of the subject matter described herein is the communication between presence gateway 122 and presence server 124 when a change in status regarding a subscribed-to presentity occurs. In a preferred implementation, this communication also occurs using the SIP protocol. FIG. 12 is a message flow diagram illustrating exemplary messages that may be exchanged between presence gateway 122 and presence server 124 in updating presence server 124 of changes in presence status. Referring to FIG. 12, in line 1 of the message flow diagram, when presence gateway 122 detects a change in status of a subscribed-to presentity, presence gateway 122 sends a Notify message to presence server 124. The Notify message includes a state change indicator indicating a new state of the subscribed-to presentity. For example, the state change may be communicated using an off hook event indicator for a subscribed-to presentity who was previously on hook. In line 2 of the message flow diagram, presence server 124 confirms receipt of the Notify message via a 200 OK message.

Although the examples described above relate primarily to deriving presence event information based on analyzing signaling messages of each protocol in isolation, the subject matter described herein is not limited to analyzing signaling messages of each protocol in isolation. For example, in one exemplary implementation, presence gateway 122 may analyze signaling messages relating to GSM and GPRS procedures together to determine whether a registration event has occurred. Such a method may include determining whether a GSM location update or a GPRS location update has occurred using steps similar to these described above with respect to FIG. 8. If a GPRS location update and a GPRS location update have occurred, the presence information for the subscriber may be updated to include both GPRS and GSM registration and location information. One advantage to using both GSM and GPRS procedures is that location area units for GSM are different than those of GPRS. By monitoring both GSM and GPRS messages, more up-to-date and accurate presence information can be achieved.

Another aspect of the subject matter described herein includes monitoring messages that are destined to multiple network elements, such as MSCNLRs, HLRs, SMSCs, GMSCs, SGSNs, and GGSNs. In the architecture illustrated in FIG. 1, probes 118 and 120 are connected to signal links and to signaling nodes that are capable of collecting messages from all of these network elements. By monitoring messages to multiple network elements, a network view of presence can be obtained as opposed to a single network element view, such as an HLR view.

Another advantage or feature of the subject matter described herein is that presence information is derived from messages relating to multiple services, such as call setup, call tear down, roaming, and location updating. Other services that may be monitored include SMS message delivery and failure, and supplementary services, such as call forwarding. Monitoring all of these services further enhances the accuracy and granularity of presence information. For example, if an SMS message is determined to be undeliverable, the presence status for a subscriber may be set to unreachable for receiving text messages.

As illustrated in FIG. 1, in one exemplary implementation, presence information is derived from signaling messages at an STP. Deriving presence information from signaling messages that traverse an STP is advantageous because the solution will work with existing handsets without requiring modifications of the handset or other devices to include presence clients. In addition, the presence information collected at an STP is more accurate than information collected using a single network element, such an HLR or a GPRS node. In addition, since STPs now include IP communications capabilities, presence information can be obtained with requiring direct access to HLR devices using SS7 protocols.

One disadvantage to deriving presence information based on signaling messages that traverse an STP is that the STP may not have visibility for intra-MSC, non-roaming calls. Similarly, in wireline networks, the STP does not have visibility for calls that involve a single switch or calls between switches that have direct signaling connections. In these cases, probes may be placed at the switches to detect the signaling messages associated with these calls. In another example, an STP may not have visibility for PDP context related protocol exchange between an SGSN and GGSN. Accordingly, as illustrated in FIG. 1, probes 120 are connected to both SGSN 104 and GGSN 106 to avoid this difficulty.

According to another aspect of the subject matter described herein, presence information may be maintained for multiple identities of a subscriber. For mobile network subscribers, the identities may include IMSIs, MSISDN numbers, and subscriber email addresses. For landline subscribers, the presence information may include subscriber directory numbers and routing numbers for ported subscribers.

Analysis of signaling messages of one or more protocols may be used to derive high level presence information, such as voice communications availability, in addition to network presence. For example, ISUP or SIP call setup and/or call tear down signaling messages may be used to determine whether a potential presentity is available to receive voice communications in addition to network presence.

The examples described above relate to monitoring many types of messages to derive presence information. The following list illustrates some of those messages and additional messages that may be monitored by presence gateway 122 to derive presence information. All of the following messages have a corresponding RESULT message in the opposite direction. Monitoring of the RESULT message may also be performed though not explicitly referenced below.

MAP/D UPDATE LOCATION—from VLR to HLR

Note: Initiated when subscriber turns on phone or changes location for GSM Services. The result will indicate if the Registration is accepted or rejected.

MAP/D CANCEL LOCATION—HLR to old VLR

Note: Indicates that subscriber has moved to a new GSM location and old VLR must remove the subscriber from its records.

MAP/D INSERT SUBSCRIBER DATA—from HLR to VLR

Note: Subscriber related data is downloaded to VLR to synchronize VLR and HLR view of the subscriber status.

MAP/D DEREGISTER MOBILE SUBSCRIBER—VLR to HLR

Note: Sparingly used.

MAP/D SEND PARAMETERS—VLR to HLR

Note: Requesting IMSI and authenticating triplets.

MAP/G SEND Parameters—from new MSC to previous MSC

Note: To request IMSI and authenticate triplets.

MAP/D PROVIDE ROAMING NUMBER—from HLR to VLR

Note: An incoming call to the GMSC (from outside the network) triggers the event.

MAP/C SEND ROUTING INFORMATION—from GMSC to HLR

Note: An incoming call to the GMSC (from outside the network) triggers this event.

MAP/C Send Routing Info for SM—from SMS gateway to HLR

Note: An incoming short message triggers this message.

MAP/C SET MESSAGE—Waiting data result, from SMS gateway to HLR

Note: Indicates that the SMS message was not delivered because it was unreachable.

MAP/D Note MS PRESENT—from MSC to HLR

Note: After not able to deliver a SM, if the MSCNLR identifies the presence of the mobile subscriber, this message is sent.

MAP/C ALERT SERVICE CENTER—from HLR top SMS Gateway:

Note: This is an alert from HLR to SMS gateway to resend the message indicating that an earlier unavailable subscriber has now become available.

MAP/H—FORWARD SHORT MESSAGE—from MSC to SMS-C

Note: This indicates a MO SM and is used to identify the mobile as present.

ISUP Messages:

Indicate the presence status of originating and terminating subscriber.

IAM

ACM

ANW

REL/RLC

Note: ISUP messages can be used to obtain the presence status of both originating and terminating subscriber. They can also be used to obtain higher level presence information, such as information indicating that subscriber is in a call. However there are cases where STP may not see an ISUP messages, such as intra-MSC, non-roaming call. In such cases, probes located at the switch or MSC may be used to collect messages used to derive presence information.

MAP/D UPDATE LOCATION—from SGSN to HLR

Note: Initiated when subscriber turns on phone or changes location for GPRS services. The result will indicate if the registration is accepted or rejected.

MA/D INSERT SUBSCRIBER DATA—from HLR to SGSN

Note: Subscriber related data is downloaded to SGSN to synchronize SGSN & HLR view of the subscriber status.

SEND AUTHENTICATION INFO—from SGSN to AuC

Note: To get authentication triplet for an IMSI

SGSN CONTEXT REQUEST/RESPONSE/ACK—from new SGSN to old SGSN

Note: This event results because of a Routing Area Update of the GPRS handset from old SGSN to a new SGSN.

MAP/D CANCEL LOCATION—HLR to old SGSN

Note: Sent for HLR to old SGSN as a result of GPRS subscriber updating Routing Area.

LNP Query and Responses:

These indicate the availability of the subscriber.

Call Forwarding Implications:

Subscriber has activated call forwarding (unconditional or unreachable).

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for maintaining and delivering presence information regarding telecommunications network subscribers, the method comprising:

at a presence gateway separate from a presence server:

(a) deriving presence information for a first set of telecommunications network subscribers based on telecommunications signaling messages relating to communications to or from members of the first set of subscribers, the first set of subscribers including at least one subscriber who is not currently subscribed to in a presence database, wherein each of the telecommunications signaling messages is a signaling system number 7 (SS7) message;

(b) determining whether presence status associated with a first subscriber in the first set of subscribers has changed based on the presence information derived for the first subscriber;

(c) in response to determining that the presence status associated with the first subscriber has changed, determining whether the first subscriber is a subscribed-to presentity;

(d) in response to determining that the first subscriber is a subscribed-to presentity, notifying a presence server of the change in presence status of the first subscriber; and (e) in response to determining that the first subscriber is not a subscribed-to presentity, caching presence information for the first subscriber at the presence gateway.

2. The method of claim 1 wherein deriving presence information comprises:

(a) receiving telecommunications signaling messages associated with a plurality of subscribers;

(b) identifying predetermined signaling messages from which presence information may be derived;

(c) from the predetermined signaling messages, identifying messages that contain identifying information associated with subscribers in the first set of subscribers; and (d) based on the signaling messages containing identifying information associated with subscribers in the first set of subscribers, generating presence status events for the subscribers in the first set of subscribers.

3. The method of claim 2 wherein identifying predetermined signaling messages from which presence information may be derived includes identifying predetermined PSTN call signaling messages.

4. The method of claim 2 wherein identifying predetermined signaling messages from which presence information may be derived includes identifying predetermined mobile signaling messages.

5. The method of claim 2 wherein identifying predetermined signaling messages includes identifying GSM and GPRS signaling messages and wherein generating presence status events includes generating the presence status events based on the GSM and GPRS signaling messages.

6. The method of claim 2 wherein identifying signaling messages includes collecting signaling messages destined for a plurality of different network elements and wherein generating presence status events includes generating presence status events based on the collected call signaling messages.

7. The method of claim 2 wherein generating presence status events includes generating a registration event for a mobile subscriber in response to receiving a mobile call signaling message indicating registration of the mobile subscriber.

8. The method of claim 2 wherein generating presence status events includes generating a roaming event in response to receiving a mobile signaling message indicating that a mobile subscriber is roaming.

9. The method of claim 2 wherein generating presence status events includes generating a handset off event in response to receiving a signaling message indicating that a mobile subscriber has deactivated a mobile handset.

10. The method of claim 1 wherein deriving presence information for a first set of telecommunications network subscribers includes maintaining a first database of potential presentities and continuously deriving and storing presence information for the potential presentities.

11. The method of claim 10 wherein determining whether the first subscriber is a subscribed-to presentity includes maintaining a second database of subscribed-to presentities representing a second set of subscribers different from the first set of subscribers and determining whether the first subscriber is present in the second database.

12. The method of claim 10 wherein maintaining a first database of potential presentities includes maintaining a plurality of identities for at least one of the potential presentities.

13. The method of claim 2 wherein identifying predetermined signaling messages includes identifying predetermined IP telephony signaling messages.

14. A method for maintaining and delivering presence information regarding telecommunications network subscribers, the method comprising:

at a presence gateway separate from a presence server:

(a) deriving presence information for a first set of telecommunications network subscribers based on telecommunications signaling messages relating to communications to or from members of the first set of subscribers, the first set of subscribers including at least one subscriber who is not currently subscribed to in a presence database, wherein deriving presence information comprises:

(i) receiving telecommunications signaling messages associated with a plurality of subscribers;

(ii) identifying predetermined signaling messages from which presence information may be derived, wherein identifying signaling messages includes collecting signaling messages that do not traverse a signal transfer point (STP) and wherein generating presence status events includes generating the presence status events for the signaling messages that do not traverse the STP;

(iii) from the predetermined signaling messages, identifying messages that contain identifying information associated with subscribers in the first set of subscribers; and (iv) based on the signaling messages containing identifying information associated with subscribers in the first set of subscribers, generating presence status events for the subscribers in the first set of subscribers;

(b) determining whether presence status associated with a first subscriber in the first set of subscribers has changed based on the presence information derived for the first subscriber;

(c) in response to determining that the presence status associated with the first subscriber has changed, determining whether the first subscriber is a subscribed-to presentity;

(d) in response to determining that the first subscriber is a subscribed-to presentity, notifying a presence server of the change in presence status of the first subscriber; and (e) in response to determining that the first subscriber is not a subscribed-to presentity, caching presence information for the first subscriber at the presence gateway.

15. A method for deriving high-level presence information based on received signaling messages, the method comprising:

at a presence gateway separate from a presence server:

(a) receiving a plurality of signaling messages relating to communications to or from members of a first set of subscribers, the first set of subscribers including at least one subscriber who is not currently subscribed to in a presence database, wherein each of the signaling messages is a signaling system number 7 (SS7) message;

(b) screening, from the signaling messages, at least one of call setup and call tear down messages regarding a first subscriber;

(c) deriving, from the at least one of call setup and call tear down messages regarding the first subscriber, presence information for the first subscriber including network location and voice communication availability information;

(d) determining whether presence status associated with the first subscriber in the first set of subscribers has changed based on the presence information derived for the first subscriber;

(e) in response to determining that the presence status associated with a first subscriber in the first set of subscribers has changed, determining whether the first subscriber is a subscribed-to presentity;

(f) in response to determining that the first subscriber is a subscribed-to presentity, forwarding the network location and voice communication availability information to the presence server; and (g) in response to determining that the first subscriber not a subscribed-to presentity, caching the network location and voice communication availability information for the first subscriber at the presence gateway.

16. A method for storing presence information on behalf of a presence server, the method comprising:

at a presence gateway separate from a presence server:

(a) deriving presence information for a subscriber based on signaling messages relating to the subscriber, wherein the subscriber is one of a first set of telecommunications network subscribers, the first set of subscribers including at least one subscriber who is not currently subscribed to in a presence database, wherein each of the signaling messages is a signaling system number 7 (SS7) message;

(b) storing the presence information for the subscriber at the presence gateway separate from the presence server;

(c) determining whether a change in presence status has occurred for the subscriber;

(d) in response to determining that a change in presence status has occurred, determining whether the subscriber is a subscribed-to presentity; and (e) in response to determining that the subscriber is a subscribed-to presentity, communicating the presence information for the subscriber to the presence server.

17. A method for communicating presence information to a presence server, the method comprising:

at a presence gateway separate from a presence server:

(a) deriving presence information for a subscriber based on signaling messages concerning the subscriber, wherein the subscriber is one of a first set of telecommunications network subscribers, the first set of subscribers including at least one subscriber who is not currently subscribed to in a presence database, wherein each of the signaling messages is a signaling system number 7 (SS7) message;

(a) determining whether presence status associated with the subscriber in the first set of subscribers has changed based on the presence information derived for the first subscriber;

(b) in response to determining that the presence status associated with the subscriber in the first set of subscribers has changed, determining whether the subscriber is a subscribed-to presentity;

(c) in response to determining that the subscriber is not a subscribed-to presentity, storing the presence information for the subscriber at the presence gateway separate from the presence server;

(d) receiving a subscription request from the presence server for obtaining presence information regarding the subscriber; and (e) in response to the subscription request, determining that the subscriber is a subscribed-to presentity and communicating the presence information to the presence server.

18. The method of claim 17 comprising continuously deriving presence information for the subscriber and automatically updating the presence server in response to detecting changes in the presence information.

19. A presence server gateway comprising:

(a) a presence gateway correlator located at a presence server gateway separate from a presence server, the presence gateway correlator for receiving telecommunications signaling messages, wherein each of the telecommunications signaling messages is a signaling system number 7 (SS7) message, for determining whether the telecommunications signaling messages are associated with subscribers in a first group of subscribers, the first group of subscribers including at least one subscriber who is not currently subscribed to in a presence database, for determining whether presence status associated with a first subscriber in the first set of subscribers has changed based on the presence information derived for the first subscriber, for, in response to determining that the presence status associated with the first subscriber in the first set of subscribers has changed, generating presence status events based on the signaling messages associated with the first subscriber in the first group of subscribers, and for, in response to determining that a subscriber is not a subscribed-to presentity, caching presence information for the first subscriber at the presence server gateway; and (b) an event manager operatively associated with the presence gateway correlator for receiving the presence status events from the message correlator, for determining whether the presence status events are associated with subscribed-to presentities, and for, in response to determining that the events are associated with subscribed-to presentities, communicating the presence status events to a presence server.

20. The gateway of claim 19 wherein the presence gateway correlator is adapted to continuously derive presence information for subscribers in the first group of subscribers based on PSTN call signaling messages received for subscribers in the first group of subscribers.

21. The gateway of claim 19 wherein the presence gateway correlator is adapted to continuously derive presence information for subscribers in the first group of subscribers based on mobile signaling messages relating to subscribers in the first group of subscribers.

22. The gateway of claim 19 wherein the presence gateway correlator is adapted to generate registration events in response to detecting registration of a subscriber in the first group of subscribers.

23. The gateway of claim 19 wherein the event manager is adapted to generate a roaming event in response to detecting roaming of a subscriber in the first group of subscribers.

24. The gateway of claim 19 wherein the message correlator is adapted to generate handset off event in response to detecting deactivation of a handset of a subscriber in the first group of subscribers.

25. The gateway of claim 19 wherein the presence gateway correlator is adapted to receive GSM and GPRS messages regarding subscribers, in the first group and to generate a presence status event based on the GSM and GPRS messages.

26. The gateway of claim 19 wherein the presence gateway correlator is adapted to receive signaling messages that do not traverse a signal transfer point (STP) and to generate the events based on the signaling messages that do not traverse the STP.

27. The gateway of claim 19 wherein the presence gateway correlator is adapted to receive signaling messages destined for a plurality of different network nodes and to generate the presence information based on the signaling messages received from the different network nodes.

28. The gateway of claim 19 comprising a potential presentities database accessible by the message correlator for identifying members of the first group of subscribers.

29. The gateway of claim 28 wherein the potential presentities database includes at least one entry storing multiple identities for a subscriber.

30. The gateway of claim 19 comprising a subscribed-to presentities database accessible by the event manager for storing information usable by the event manager for indicating whether a presence status event is associated with a subscribed-to presentity.

31. A system for communicating presence information to a presence server, the system comprising:
(a) a plurality of probes for collecting signaling messages regarding a subscriber, wherein the subscriber is one of a first set of telecommunications network subscribers, the first set of subscribers including at least one subscriber who is not currently subscribed to in a presence database, wherein each of the signaling messages is a signaling system number 7 (SS7) message; and
(b) a presence gateway separate from a presence server for receiving the signaling messages, for deriving presence information for the subscriber based on the signaling messages concerning the subscriber, for determining whether presence status associated with the subscriber in the first set of subscribers has changed based on the presence information derived for the first subscriber, for, in response to determining that the presence status associated with the subscriber in the first set of subscribers has changed, determining whether the subscriber is a subscribed-to presentity, for, in response to determining that the subscriber is not a subscribed-to presentity, storing the presence information for the subscriber at the presence gateway separate from the presence server, for receiving a subscription request from a presence server for obtaining presence information regarding the subscriber, and, in response to the subscription request, for determining that the subscriber is a subscribed-to presentity and communicating the presence information to the presence server.

32. The system of claim 31 wherein the presence gateway is adapted to continuously derive presence information for the subscriber and to automatically update the presence server in response to detecting changes in the presence information.

33. A non-transitory computer readable medium having stored thereon computer executable instructions that when executed by a processor of a computer perform steps comprising:
at a presence gateway separate from a presence server:
(a) deriving presence information for a first set of telecommunications network subscribers based on telecommunications signaling messages relating to communications to or from members of the first set of subscribers, the first set of subscribers including at least one subscriber who is not currently subscribed to in a presence database, wherein each of the telecommunications signaling messages is a signaling system number 7 (SS7) message;
(b) determining whether presence status associated with a first subscriber in the first set of subscribers has changed based on the presence information derived for the first subscriber;
(c) in response to determining that the presence status associated with the first subscriber has changed, determining whether the first subscriber is a subscribed-to presentity;
(d) in response to determining that the first subscriber is a subscribed-to presentity, notifying a presence server of the change in presence status of the first subscriber; and
(e) in response to determining that the first subscriber is not a subscribed-to presentity, caching presence information for the first subscriber at the presence gateway.

34. The non-transitory computer readable medium of claim 33 comprising receiving a subscribe message from a presence server for subscribing to the first subscriber, and, in response:
(a) extracting presence status information from the database for the presentity identified in the subscribe message; and
(b) communicating the presence status information to the presence server.

* * * * *